US008571790B2

(12) United States Patent
Tanabe et al.

(10) Patent No.: US 8,571,790 B2
(45) Date of Patent: Oct. 29, 2013

(54) METHOD FOR SWITCHING REFERENCE MAP DATA IN NAVIGATION DEVICE, COMPUTER READABLE MEDIUM FOR THE SAME, AND NAVIGATION DEVICE

(75) Inventors: Atsushi Tanabe, Anjo (JP); Kazunori Watanabe, Okazaki (JP); Kenji Nagase, Okazaki (JP); Tetsuo Kumagai, Okazaki (JP)

(73) Assignees: Denso Corporation, Kariya (JP); Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 241 days.

(21) Appl. No.: 13/047,980

(22) Filed: Mar. 15, 2011

(65) Prior Publication Data
US 2011/0238305 A1 Sep. 29, 2011

(30) Foreign Application Priority Data
Mar. 24, 2010 (JP) .................................. 2010-68804

(51) Int. Cl.
*G01C 21/00* (2006.01)
(52) U.S. Cl.
USPC ........................................................ 701/410
(58) Field of Classification Search
None
See application file for complete search history.

(56) References Cited

U.S. PATENT DOCUMENTS

| | | | |
|---|---|---|---|
| 2003/0197626 A1* | 10/2003 | Endo et al. .................. | 340/995.1 |
| 2006/0227973 A1 | 10/2006 | Takashima et al. | |
| 2008/0004800 A1 | 1/2008 | Arita et al. | |
| 2008/0222166 A1* | 9/2008 | Hultgren et al. .............. | 707/100 |
| 2008/0229415 A1* | 9/2008 | Kapoor et al. ................... | 726/22 |
| 2009/0019095 A1* | 1/2009 | Asahara et al. ................ | 707/203 |
| 2009/0115791 A1* | 5/2009 | Booth, Jr. ....................... | 345/537 |
| 2009/0192706 A1 | 7/2009 | Nomura et al. | |
| 2009/0210388 A1* | 8/2009 | Elson et al. ....................... | 707/3 |

FOREIGN PATENT DOCUMENTS

| | | |
|---|---|---|
| JP | A-2004-272532 | 9/2004 |
| JP | A-2006-3113 | 1/2006 |

* cited by examiner

*Primary Examiner* — Thomas Tarcza
*Assistant Examiner* — Adam Alharbi
(74) *Attorney, Agent, or Firm* — Posz Law Group, PLC

(57) ABSTRACT

A method for switching a reference map data in a navigation device having a map data memory for storing a plurality of map data, the navigation device executing a navigation function with using a first map data among the plurality of map data stored in the map data memory as the reference map data, the method includes: reading out a second map data from a memory medium; determining whether the map data memory already stores a same map data as the second map data; and switching the reference map data from the first map data to the same map data as the second map data when the map data memory already stores the same map data as the second map data in the memory medium.

8 Claims, 2 Drawing Sheets

METHOD FOR SWITCHING REFERENCE MAP DATA IN NAVIGATION DEVICE, COMPUTER READABLE MEDIUM FOR THE SAME, AND NAVIGATION DEVICE

CROSS REFERENCE TO RELATED APPLICATION

This application is based on Japanese Patent Application No. 2010-68804 filed on Mar. 24, 2010, the disclosure of which is incorporated herein by reference.

TECHNICAL FIELD

The present invention relates to a method for switching a reference map data in a navigation device. The map data is stored in a memory medium arranged in the navigation device. Further, a computer readable medium includes the instructions providing the method for switching the reference map data in the navigation device.

BACKGROUND

As described in JP-A-2004-272532, a memory medium such as a hard disk drive, which is rewritable, is used in an in-vehicle navigation device. The memory medium stores map data and the like.

Regarding the map data, periodically, new map data is formed so as to update new road information. When the map data in the navigation device is updated to new version map data, the new version map data is overwritten in a storing region of old version map data in the memory medium such as the hard disk drive, which is rewritable. As a result, the old version map data is replaced to the new version map data, and therefore the old version map data is deleted from the memory medium.

However, when the old version map data is deleted, it is difficult to revive the old version map data if a certain bug is found in the new version map data.

Further, for example, when the map data provides a large area map such as the European map, the large area to be covered with the map is divided into multiple regions. Then, the map data is also divided into multiple portions, each of which corresponds to a respective region. In this case, when a location is searched in the map, it is possible to reduce the number of object data. Accordingly, a process time for searching the location is reduced.

However, when the region is switched to another region, and a map data version of the original region is different from a map data version of a new region, it may be necessary to rewrite a whole of the map data stored in the memory medium from the map data of the original region to the map data of the new region. In this case, it is not convenient for the user.

SUMMARY

In view of the above-described problem, it is an object of the present disclosure to provide a method for switching a map data in a navigation device easily. The map data is stored in a memory medium arranged in the navigation device. It is another object of the present disclosure to provide a computer readable medium including instructions providing a method for switching a reference map data in a navigation device. It is further another object of the present disclosure to provide a navigation device for executing a method for switching a reference map data in the navigation device.

According to a first aspect of the present disclosure, a method for switching a reference map data in a navigation device having a map data memory for storing a plurality of map data, the navigation device executing a navigation function with using a first map data among the plurality of map data stored in the map data memory as the reference map data, the method includes: reading out a second map data from a memory medium; determining whether the map data memory already stores a same map data as the second map data; and switching the reference map data from the first map data to the same map data as the second map data when the map data memory already stores the same map data as the second map data in the memory medium.

In the above method, when the map data memory already stores the same map data as the second map data, the reference map data is switched from the first map data to, the same map data as the second map data without writing the second map data in the map data memory. Thus, the switching time of the reference map data is reduced. Further, it is not necessary to select and determine the reference map data among the stored multiple map data. Thus, since it is not necessary to build a new user interface for selecting and determining, a manufacturing cost of the navigation device is not increased. Furthermore, since the memory medium distributed to a registered user is used for switching the reference map data, unregistered user cannot switch the reference map data.

According to a second aspect of the present disclosure, a computer readable medium includes instructions being executed by a computer, the instructions including the method for switching the reference map data in the navigation device according to the first aspect of the present disclosure, the method being computer-implemented.

In the above medium, the switching time of the reference map data is reduced. Further a manufacturing cost of the navigation device is not increased. Furthermore, unregistered user cannot switch the reference map data.

According to a third aspect of the present disclosure, a navigation device for executing the method for switching the reference map data in the navigation device according to the first aspect of the present disclosure, the device includes: a navigation body for executing the method; and the map data memory.

In the above device the switching time of the reference map data is reduced. Further, a manufacturing cost of the navigation device is not increased. Furthermore unregistered user cannot switch the reference map data.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
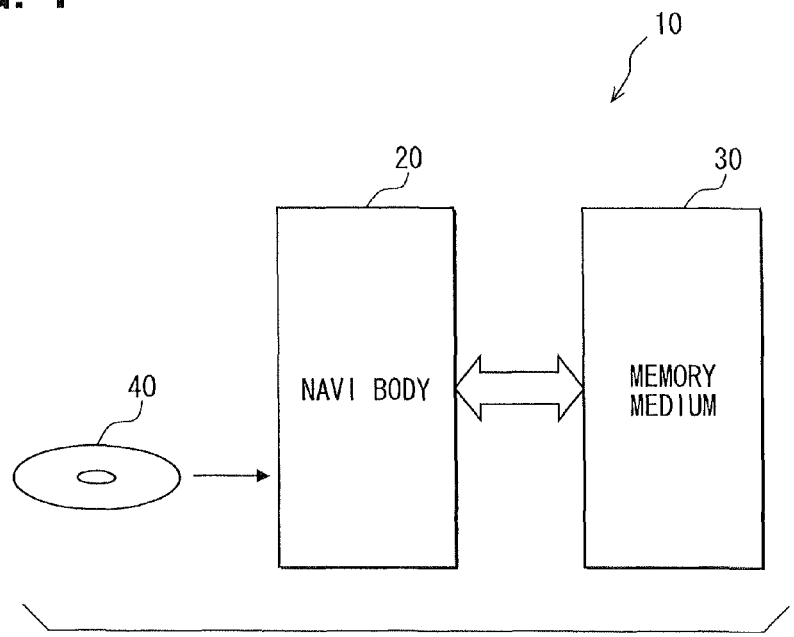
FIG. 1 is a diagram showing a navigation device.

A method for switching map data will be explained. FIG. 1 shows a navigation device 10.

The navigation device 10 includes a body 20 of the navigation device and a map memory medium 30 as a map data memory.

The body 20 includes a micro computer, a display and a GPS receiver. The micro computer includes a CPU, a ROM, a RAM a I/O element and a bus line, which couples with the CPU, the ROM, the RAM and the I/O element. The ROM stores a program for executing various processes of the navigation device 10. According to the program, the CPU and the like execute certain calculation processes. Thus, the navigation device 10 provides various navigation information. For example, the device 10 displays a current position of the vehicle detected by the GPS receiver over the road map. Alternatively, the device 10 changes a map scale of the road map. Further, the device 10 scrolls the road map according to a user instruction. Alternatively, the navigation device 10 performs demonstration guidance for explaining various functions in the navigation device 10.

Further, the navigation device 10 includes an interface for retrieving the map data from a memory medium 40 as an external memory medium. The memory medium 40 stores the map data, which is updated. For example, when the memory medium 40 is a DVD (i.e., digital versatile disc), the navigation device 10 includes a slot and a DVD reader. The DVD is inserted into the slot, and the DVD reader reads out data in the DVD. Alternatively, the memory medium 40 may be a memory card or a USB memory. In this case, the navigation device 10 includes a memory card reader or a USB port as an interface.

The map memory medium 30 includes a HDD (i.e., hard disk drive) capable of rewriting data stored in the HDD. The HDD has a storage capacity for storing multiple map data. Alternatively, the map memory medium 30 may include another type of memory as long as the memory is capable of storing multiple map data.

Figure 2:
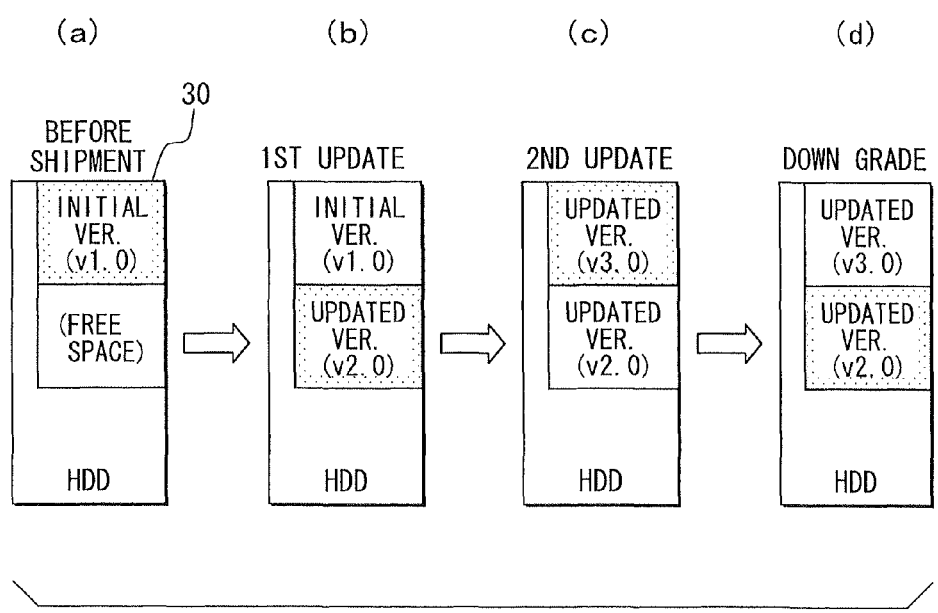
FIGS. 2A to 2D are diagrams showing steps for switching the map data when new version map data is stored in a memory medium.

In the navigation device 10, a method for switching the map data from initial map data to new map data will be explained with reference to FIGS. 2A to 3.

The map memory medium 30 has the storage capacity for storing multiple map data. Multiple map data is divided in each directory or by partitions so that each map data is separately stored in the medium 30. The map data includes a data item showing the map, map information item and the like. The map information item relates to a license key for identifying a registered user, a version of the map data, information about update history and sorting location information. Further, the map data has a proper file name. Thus, when multiple map data is stored in the medium 30, each map data can be identified by the map information item, the file name, the file size and the like. Thus, the navigation device 10 specifies one of the map data as an initial map data, i.e., reference map data. The device 10 reads out the data item from the reference map data so that the device 10 provides navigation to a user.

When new map data having a new version is stored in the medium 30, the medium 30 includes multiple map data. In general, when a new road is built, and a structure of the road is changed, new map data is periodically formed by a provider. When the user obtains the new map data, the user operates the device 10 to store the new map data so that old map data is updated. Specifically, the memory medium 40 storing the new map data is inserted into the navigation device 10, so that the navigation device 10 reads the new map data from the medium 40. An example of a case where the old version map data is stored in the map memory medium 30, and the new version map data for covering the same area as the old version map data is to be stored in the map memory medium 30.

Figure 3:
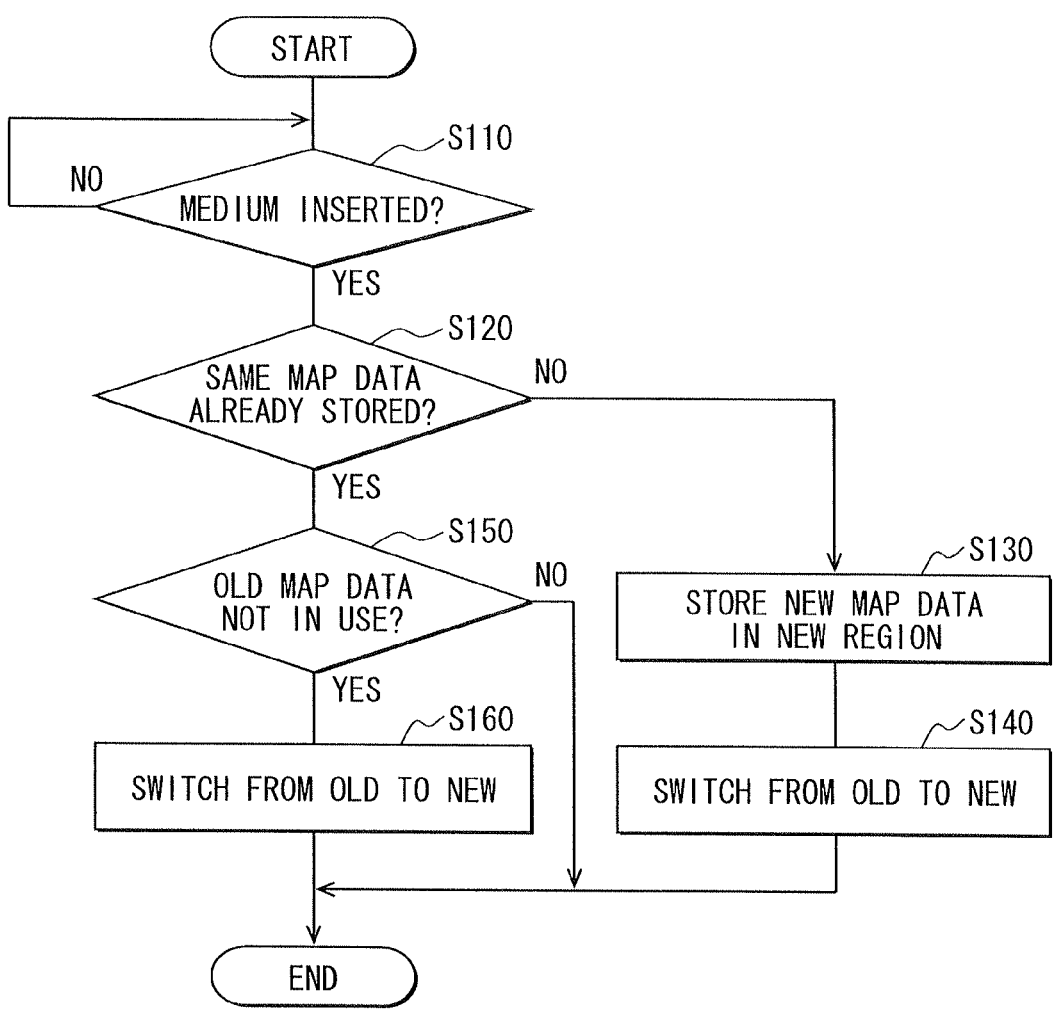
FIG. 3 is a flowchart showing a process for switching the map data in the navigation device.

When the memory medium 40 storing the new version map data is inserted into the navigation device 10, as shown in FIG. 3, in step S110, the device 10 determines that the memory medium 40 is inserted into the device 10, and the map memory medium 30 is ready for reading out the new map data from the memory medium 40. Then, it goes to step S120. In step S120, the device 10 determines whether the same map data as the new version map data has been already stored in the map memory medium 30. The determination process in step S120 is performed based on at least one of the map information, the file name information and the file size information.

The memory medium 40 may store a whole of the new map data, which is equivalent to the old map data stored in the map memory medium 30. Alternatively, the memory medium 40 may store only an updated part of the old map data. In this case, the memory medium 40 stores differential information. Alternatively, the memory medium 40 may store only a license key for identifying a registered user when the old map data is updated via a communication network.

Thus, when a whole of the new map data is not stored in the memory medium 40, the file name and the file seize of the new map data do not coincide with those of the old map data. Thus, the device 10 determines based on the map information such as the license key, the version of the map data the information about update history and sorting location information whether the map information in the old map data stored in the map memory medium 30 coincides with the map information in the new map data stored in the memory medium 40.

The above license key is distributed to each registered user when the map data is updated. When the map data is updated, i.e., when the version of the map data is changed, the license key to be distributed to the registered user is also changed. Accordingly, the version of the map data that the user requires to use is identified by the license key.

In step S120, when the device 10 determines that the map memory medium 30 does not store the same map data, it goes to step S130. In step S130, the new map data is read out from the memory medium 40, and then, stored in a region of the map memory medium 30, which is different from a region of the medium 30 in which the current reference map data is stored. Thus both of the old and new version map data are stored in different regions of the map memory medium 30, respectively.

As shown in FIG. 2A, when the navigation device 10 is shipped out from a manufacturer or the like, the map memory medium 30 stores the most recent version map data at that time. In FIG. 2A, the most recent version map data is defined as the initial map data of v 1.0 After the shipment, a new version map data is released. The new version map data is defined as the first updated map data of v 2.0. When the user operates the device 10 to store the new version map data in the map memory medium 30 the device 10 determines that the map memory medium 30 does not store the same map data, i.e., the new version map data is different from the initial map data. Accordingly, the first updated map data is stored in the region of the map memory medium 30 different from the region, in, which the initial map data is stored. The device 10 presently refers to the initial map data.

In step S140, the device 10 switches the reference map data from the initial map data to the first updated map data. Thus, the device 10 provides the navigation function according to the new version map data.

Here, a shaded area in FIG. 2A shows that the old version map data, i.e., the initial map data of v 1.0 is used as the reference map data. A shaded area in FIG. 2B shows that the new version map data, i.e., the first updated map data of v 2.0 is used as the reference map data.

After that, the brand-new version map data defined as the second updated map data of v 3.0 is released. The user inserts the memory medium 40 storing the second updated map data so that the second updated map data is stored in the map memory medium 30.

In this case, steps S110 to S140 are executed again so that the second updated map data is stored in a region of the map memory medium 30, which is different from the region of the medium 30 in which the current reference map data, i.e., the first updated map data is stored. Specifically, as shown in FIG. 2C, the second updated map data is stored in the region, in which the initial map data is preliminary stored (i.e., installed) so that the initial map data is replaced with the second updated map data. Thus, the second updated map data is used as the reference map data. Thus both of the first and second updated map data are stored in different regions of the map memory medium 30, respectively.

Here, when the map memory medium 30 has a storage capacity for storing all of the initial, the first updated and the second updated map data, the second updated map data may be stored in a region of the medium 30, which is different from the region of the initial map data and the region of the first updated map data. Thus, the medium 30 stores three different version map data. The number of the map data to be stored in the map memory medium 30 depends on the storage capacity of the medium 30.

When the medium 30 stored equal to or more than three different version map data, the most recent map data is to be stored, and the number of the map data reaches the upper limit of the storage capacity, the most recent map data is stored in the region of the oldest version map data so that the oldest version map data is replaced with the most recent map data.

Here, in FIG. 3C, when the second updated map data as the reference map data includes a certain fault, and the user considers to down grade the second updated map data so that the first updated map data is used as the reference map data.

When the second updated map data is down graded to the first updated map data, the device 10 switches the reference map data from the second updated map data to the first updated map data. Thus, the device 10 executes the following process.

Here, before the device 10 executes the down grade process, the user has to insert the memory medium 40 storing the first updated map data into the device 10. Accordingly, the instruction for the down grade process should be described in a manual of the navigation device 10.

When the user inserts the memory medium storing the first updated map data, in step S110, the device 10 determines that the memory medium has been inserted. Further, in step S120, the device 10 determines that the map memory medium 30 stores the same map data as the first updated map data in the inserted memory medium 40, and then, it goes to step S150.

In step S150, the device 10 determines whether the map data in the map memory medium 30, which is the same as the first updated map data stored in the inserted memory medium 40, is not used as the reference map data at the present time. When the determination in step S150 is "NO," i.e., when the map data in the map memory medium 30 corresponding to the first updated map data in the memory medium 40 is used as the reference map data at the present time, it is not necessary to switch the reference map data from the map data in the medium 30 to the map data in the medium 40. Thus, in this case, the process for switching the map data ends.

When the determination in step S150 is "YES," i.e. when the map data in the map memory medium 30 corresponding to the first updated map data in the memory medium 40 is not used as the reference map data at the present time it goes to step S160. In step S160, the device 10 switches the reference map data from the currently referred map data to the map data stored in the inserted memory medium 40. Specifically, the device 10 switches the reference map data from the second updated map data in the medium 30 to the first updated map data in the inserted memory medium 40. FIG. 2D shows that the reference map data is switched from the second updated map data, i.e., the most recent map data to the first updated map data, i.e., the older version map data.

Thus, in the process for switching the reference map data, when the map memory medium 30 stores the map data, which is required for the user to be used as the reference map data, and the user inserts the memory medium 40 storing the map data to be used, the reference map data is switched to the map data to be used. In this case, it is not necessary to write the map data to be used. Thus, the switching time of the reference map data is reduced.

When the map memory medium 30 stores multiple map data, it is not necessary for the user to select and determine one of the multiple map data as the reference map data. Thus, it is not necessary to form a user-interface such as a setting screen image for selecting the reference map data. A manufacturing cost of the device 10 is not increased. Further, it is always executed that the memory medium 40 storing the map data is distributed to the registered user of the navigation device 10. Thus, in general, the reference map data is switched with using the memory medium 40 distributed to the registered user. A unregistered user can not switch the reference map data easily.

In the present embodiment, when it is necessary to write the new version map data in the map memory medium 30, the new version map data is stored in the region different from the region, in which the currently referred map data is stored. Accordingly, the navigation device 10 can continuously provide the navigation function with reference to the map data already stored in the map memory medium 30 even if the device 10 is writing the new version map data in the map memory medium 30.

In the above embodiment, the map memory medium 30 stores the old and new version map data. The medium 30 may store other types of map data. For example, when the map data represents a large area such as Europe, the map data may be divided into multiple portions so that each portion of the map data provides a corresponding part of the map. For example, the European map is divided into two parts. One part is an eastern Europe map, and the other part is a western Europe map. Alternatively, one part is a south Europe map, and the other part is a north Europe map.

When the user switches the map data from one area map to another, and the map data for covering the one area is different from the map data for covering the other area, the user inserts the memory medium 40 storing the map data for covering the other area in the navigation device 10. Thus, the device 10 can easily switch the reference map data from the map data for covering the one area to the map data for covering the other area.

The above disclosure has the following aspects.

According to a first aspect of the present disclosure a method for switching a reference map data in a navigation device having a map data memory for storing a plurality of map data, the navigation device executing a navigation function with using a first map data among the plurality of map data stored in the map data memory as the reference map data, the method includes: reading out a second map data from a memory medium; determining whether the map data memory already stores a same map data as the second map data; and switching the reference map data from the first map data to the same map data as the second map data when the map data memory already stores the same map data as the second map data in the memory medium.

In the above method, when the map data memory already stores the same map data as the second map data, the reference map data is switched from the first map data to the same map data as the second map data without writing the second map data in the map data memory. Thus, the switching time of the reference map data is reduced. Further, it is not necessary to select and determine the reference map data among the stored multiple map data. Thus since it is not necessary to build a new user interface for selecting and determining a manufacturing cost of the navigation device is not increased. Furthermore, since the memory medium distributed to a registered user is used for switching the reference map data unregistered user cannot switch the reference map data.

Alternatively, the method may further include: writing the second map data in a second region of the map data memory different from a first region of the map data memory, in which the first map data is stored, when the map data memory does not store the same map data as the second map data; and switching the reference map data from the first map data to the second map data. In this case, the first map data as the reference map data that the navigation device currently uses for executing the navigation function and the second map data written in the map data memory are disposed in the map data memory. After the reference map data is switched from the first map data to the second map data, the device can easily switch the reference map data again from the second map data to the first map data.

Alternatively, each of the plurality of map data may represent a same area map, and one of the plurality of map data has a map version, which is different from another one of the plurality of map data. In this case, for example, even when a new version map data may be malfunction, the reference map data is easily switched from the new version map data to an old version map data.

Alternatively, each of the plurality of map data may represent a same area map. One of the plurality of map data has a map version, which is different from another one of the plurality of map data. The navigation device may execute the navigation function with using the first map data stored in the first region of the map data memory while the navigation device is writing the second map data in the second region of the map data memory, and the map version of the first map data is different from the map version of the second map data. In this case, without stopping the navigation function in the navigation device the device can write the second map data in the map data memory.

Alternatively, an area map covered by one of the plurality of map data may be different from an area map covered by another one of the plurality of map data. In this case, since the map data is divided into individual area maps, so that the searching time is improved.

Alternatively, the map data memory may further store map information corresponding to one of the plurality of map data when the one of the plurality of map data is written in the map data memory. The map information includes at least one of license key information, version information and updated history information of the one of the plurality of map data. The license key is used for identifying a registered user. The navigation device determines that the map data memory already stores the same map data as the second map data when the map information of the second map data coincides with a map data in the map data memory.

Alternatively, the method may further include: determining whether the same map data as the second map data is used as the reference map data before the switching of the reference map data from the first map data to the same map data as the second map data. The switching of, the reference map data from the first map data to the same map data as the second map data is performed when the same map data as the second map data is not used as the reference map data.

Alternatively, the method may further include: inserting the memory medium into a slot of the navigation device before the reading out of the second map data. The switching of the reference map data from the first map data to the same map data as the second map data is not performed when the same map data as the second map data is used as the reference map data.

Further, the method may further include: writing the second map data in a second region of the map data memory different from a first region of the map data memory, in which the first map data is stored, when the map data memory does not store the same map data as the second map data; and switching the reference map data from the first map data to the second map data. The navigation device executes the navigation function with using the first map data stored in the first region of the map data memory while the navigation device is writing the second map data in the second region of the map data memory.

Furthermore the map data memory may further store map information corresponding to one of the plurality of map data when the one of the plurality of map data is written in the map data memory. The map information includes at least one of license key information, version information and updated history information of the one of the plurality of map data. The license key is used for identifying a registered user. The navigation device determines that the map data memory already stores the same map data as the second map data when the map information of the second map data coincides with a map data in the map data memory.

According to a second aspect of the present disclosure, a computer readable medium includes instructions being executed by a computer, the instructions including the method for switching the reference map data in the navigation device according to the first aspect of the present disclosure, the method being computer-implemented.

In the above medium, the switching time of the reference map data is reduced. Further, a manufacturing cost of the navigation device is not increased. Furthermore, unregistered user cannot switch the reference map data.

According to a third aspect of the present disclosure, a navigation device for executing the method for switching the reference map data in the navigation device according to the first aspect of the present disclosure, the device includes: a navigation body for executing the method; and the map data memory.

In the above device, the switching time of the reference map data is reduced. Further, a manufacturing cost of the navigation device is not increased. Furthermore unregistered user cannot switch the reference map data.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations including more, less or only a single element, are also within the spirit and scope of the invention.

What is claimed is:
1. A method for switching a reference map data in a navigation device having a map data memory for storing a plural- ity of map data, the navigation device executing a navigation function with using a first map data among the plurality of map data stored in the map data memory as the reference map data the method comprising:

reading out a second map data from an external memory medium;

determining whether the map data memory in the navigation device already stores a same map data as the second map data;

switching the reference map data from the first map data to the second map data already stored in the map data memory of the navigation device without installing the second map data from the external memory medium, when the map data memory already stores the same map data as the second map data in the external memory medium;

determining whether the same map data as the second map data is used as the reference map data before the switching of the reference map data from the first map data to the same map data as the second map data;

receiving the external memory medium inserted into a slot of the navigation device before the reading out of the second map data;

writing the second map data in a second region of the map data memory in the navigation device different from a first region of the map data memory in the navigation device, in which the first map data is stored, when the map data memory in the navigation device does not store the same map data as the second map data; and switching the reference map data from the first map data to the second map data, wherein the switching of the reference map data from the first map data to the same map data as the second map data is performed when the same map data as the second map data is not used as the reference map data;

wherein the switching of the reference map data from the first map data to the same map data as the second map data is not performed when the same map data as the second map data is used as the reference map data, wherein the navigation device executes the navigation function with using the first map data stored in the first region of the map data memory in the navigation device while the navigation device is writing the second map data in the second region of the map data memory in, the navigation device.

2. The method according to claim 1, wherein an area map covered by one of the plurality of map data is different from an area map covered by another one of the plurality of map data.

3. The method according to, claim 1, wherein the map data memory in the navigation device further stores map information corresponding to one of the plurality of map data when the one of the plurality of map data is written in the map data memory in the navigation device, wherein the map information includes at least one of license key information, version information and updated history information of the one of the plurality of map data, wherein the license key is used for identifying a registered user, and wherein the navigation device determines that the map data memory in the navigation device already stores the same map data as the second map data when the map information of the second map data coincides with a map data in the map data memory in the navigation device.

4. The method according to claim 1, wherein the map data memory in the navigation device further stores map information corresponding to one of the plurality of map data when the one of the plurality of map data is written in the map data memory in the navigation device, wherein the map information includes at least one of license key information, version information and updated history information of the one of the plurality of map data, wherein the license key is used for identifying a registered user, and wherein the navigation device determines that the map data memory in the navigation device already stores the same map data as the second map data when the map information of the second map data coincides with a map data in the map data memory in the navigation device.

5. A non-transitory computer readable medium comprising instructions being executed by a computer, the instructions including the method for switching the reference map data in the navigation device according to claim 1, the method being computer-implemented.

6. A navigation device for executing the method for switching the reference map data in the navigation device according to claim 1, the device comprising:

a navigation body for executing the method; and the map data memory.

7. The method of claim 1, wherein the switching of the reference map data from the first map data to the second map data is initiated in response to the external memory medium being inserted into the navigation device, for the reading out of the second map data.

8. The method of claim 1, wherein the navigation device is for vehicular navigation in connection with a geographical map, and the map data includes the geographical map.

\* \* \* \* \*